April 20, 1948.    R. A. LINGEN ET AL    2,440,052
AVERAGING CONTROLLER
Filed Sept. 24, 1945    4 Sheets-Sheet 1
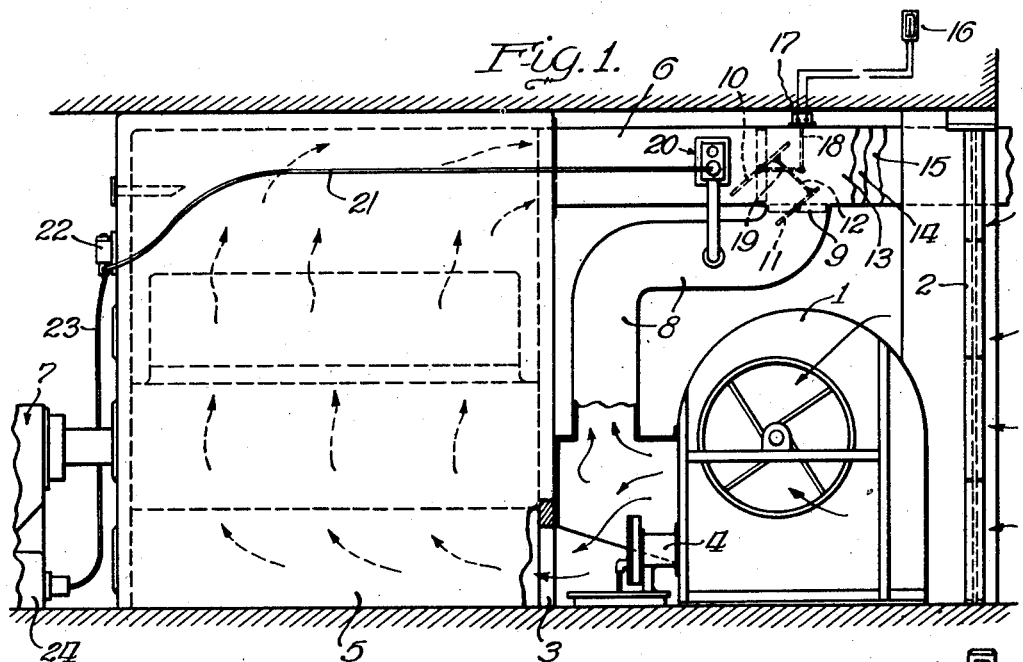
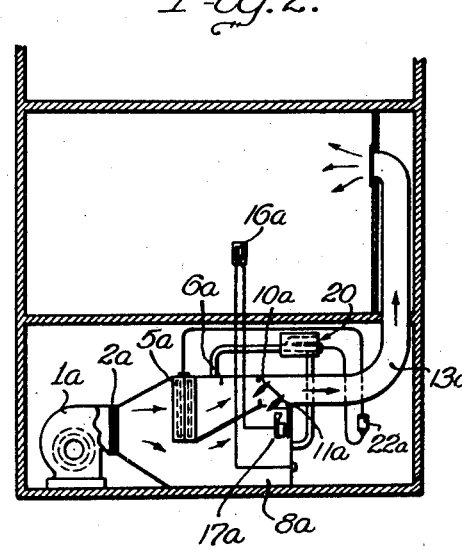
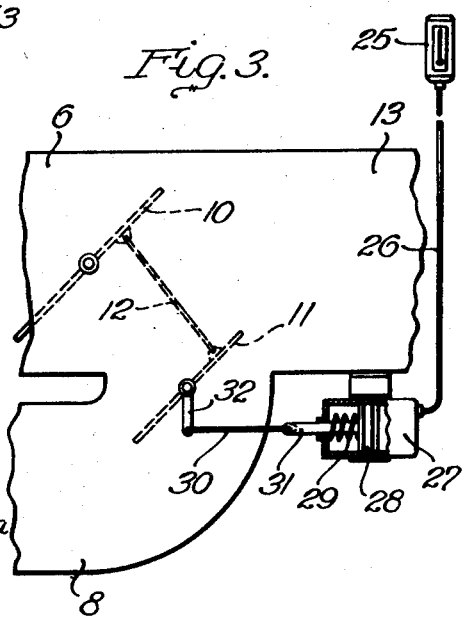
INVENTORS:
Ralph A. Lingen
Lloyd E. Cross
By: Charles R Wood
Agent.

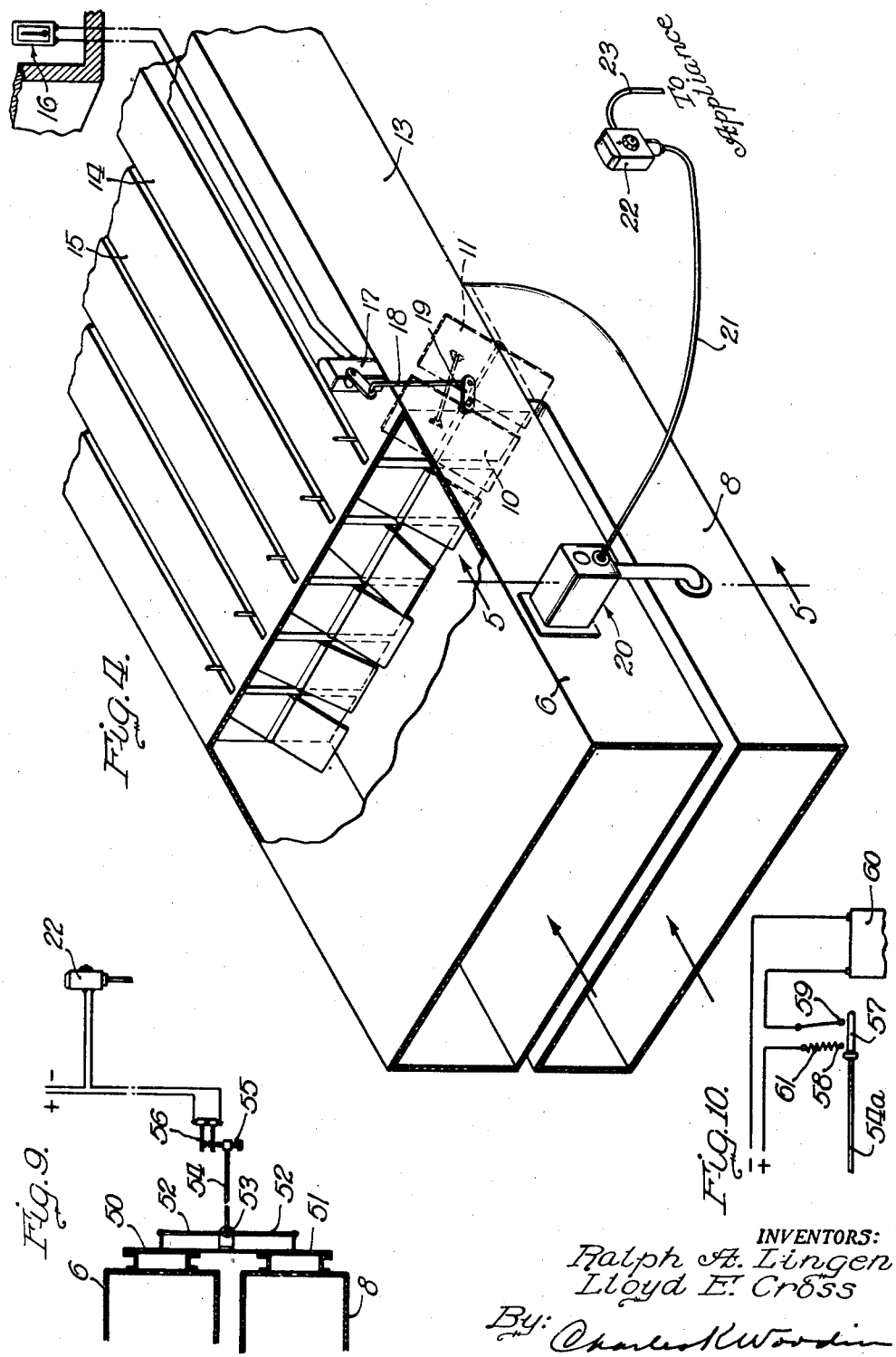

April 20, 1948.          R. A. LINGEN ET AL          2,440,052
                          AVERAGING CONTROLLER
Filed Sept. 24, 1945                    4 Sheets-Sheet 3
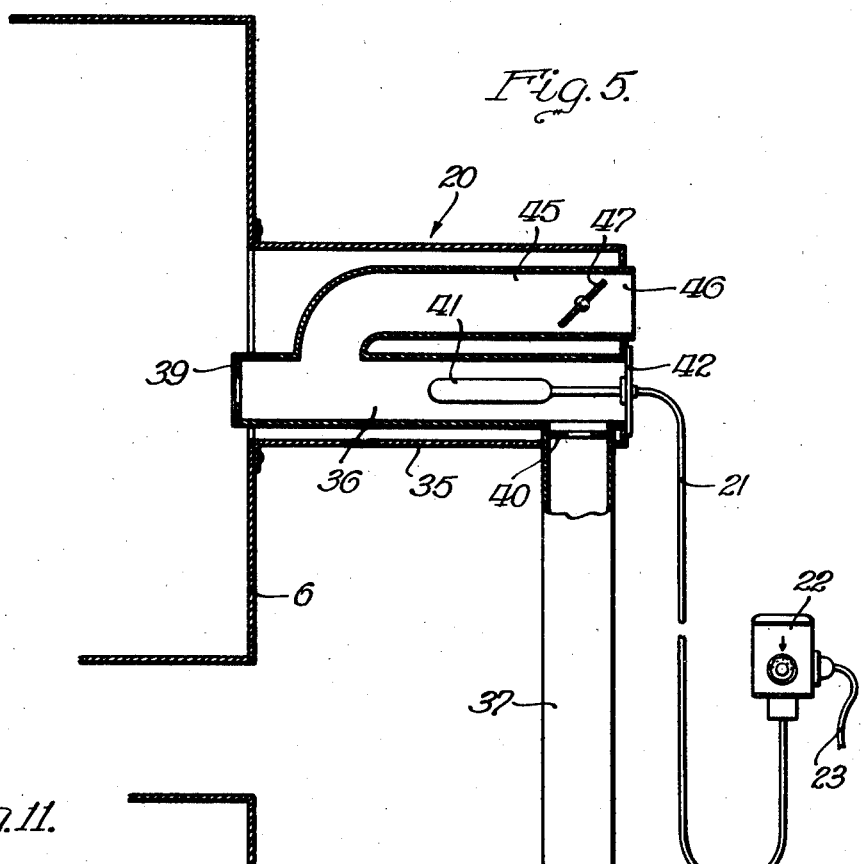
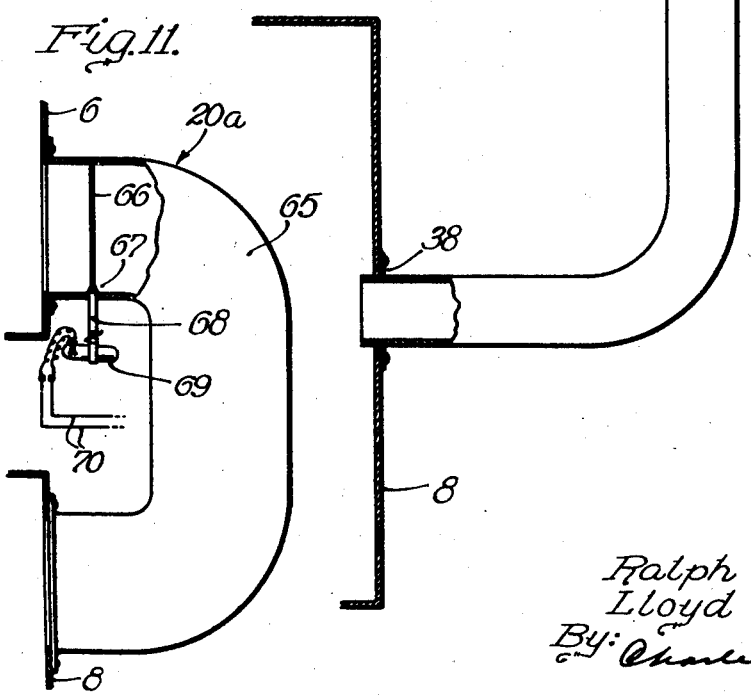
INVENTORS:
Ralph A. Lingen
Lloyd E. Cross
By: Charles K. Wooden
              Agent.

April 20, 1948.  R. A. LINGEN ET AL  2,440,052
AVERAGING CONTROLLER
Filed Sept. 24, 1945  4 Sheets-Sheet 4

INVENTORS:
Ralph A. Lingen
Lloyd E. Cross
By: Charles K Woodin
Agent.

Patented Apr. 20, 1948

2,440,052

UNITED STATES PATENT OFFICE 2,440,052

AVERAGING CONTROLLER

Ralph A. Lingen and Lloyd E. Cross, Milwaukee, Wis., assignors of one-fourth to Ruth Sharp Lingen and one-fourth to Marie Emmett Cross, Milwaukee, Wis.

Application September 24, 1945, Serial No. 618,310

12 Claims. (Cl. 236—13)

The present invention relates to an averaging controller utilized for maintaining the output of automatic heating and cooling appliances, such as stokers, oil burners, gas burners, compressors, heating or cooling coils, and other analogous devices, directly in step with building requirements as established through the collective action of the thermostats in the various rooms or chambers of the controlled areas of a building; thus providing a means for compensating directly for the changes created within the building due to outside weather conditions but with the operation of such appliances strictly determined by the requirements inside the structure.

The averaging controller of the present design has numerous applications in carrying out the functions for which the same was devised. One of the main objects of the averaging controller is to produce a resultant volume of treated air deliverable through one or more ducts to the rooms or spaces being treated or conditioned by such air in combination with a dual damper arrangement operating respectively in warm air and cold air ducts. The action of the dampers in each respective duct system creates a variation in duct pressures, and by utilizing this pressure differential for the purpose of creating air flow through the averaging controller which connects such pair of ducts immediately preceding the dampers, a very definite modulating control system is established. A thermal bulb placed in the air flow path of the averaging controller responds to the temperature of the air therein and directly cooperates with an adjustable temperature controller which is connected with the particular appliance used to heat or cool the air flowing through either one or the other of the main ducts, such dual air streams being mixed through the damper control unit.

Obviously, each pair of connected dampers provide tempering or modulating means for establishing a predetermined flow of mixed air through these discharge ducts carrying the treated air to the particular space or room drawing the supply therefrom. This room is provided with the usual form of thermostat having the necessary connections for operating the combination of dampers that regulate the air flow to the particular duct leading to that thermostatically controlled room.

It is a known fact that thermostatic control systems, wherein modulating type thermostats position mixing dampers, are very frequently and generally used as means for controlling temperature in structures having many spaces or rooms air conditioned. One of the chief difficulties experienced in systems of this type has been in maintaining the proper temperature of the supply air and at the same time avoid an operation wherein the mixing dampers travel to either of their extreme limits during such regulation.

When this happens alternate blasts of warm and cool air are delivered into the conditioned areas producing undesirable results.

One of the further objects of the present invention is to provide an averaging controller in an air treating system which will overcome such objectionable deliverance of air to treated spaces or rooms. The operation of the averaging controller is such that the control of the supply air temperature is maintained at the proper level to furnish the necessary amount of conditioned air required. Its operating causes the automatic fuel or cooling appliance to maintain varying supply chamber temperatures as required by changing conditions in the controlled areas, and by holding the treated air in the respective channels to the rooms or spaces in direct proportion as these are demanded by the position of the thermostatically controlled mixing dampers.

It should be understood that there is no better indication of the heat loss or gain of a structure, as caused by outside weather conditions, than a temperature within the structure. These respective inside conditions are constantly communicated to the averaging controller through the operation of the individual thermostats in the various areas through their positioning of the mixing dampers. The solution of this problem has been attempted through maintaining the heat supply in conformance with changing outside weather conditions, but the conditions inside the structure are effected by other factors, such as occupancy, and the averaging controller of the present invention takes these factors into account, as well as the heat loss and heat gain transmitted through the strucure iself.

Therefore, the concept underlying the averaging controller is derived from a principle of operation which is based upon the fact that when two chambers of unequal pressures are connected together with a conduit, a flow of air will be established from the chamber of the higher pressure to the chamber of the lower pressure in the attempt to equalize the pressure between such two chambers. When the pressures are balanced within the two chambers, there is no flow of air through the conduit connecting such chambers, but at the slightest unbalance of pressure flow is again reestablished, and a thermal bulb inserted in the conduit will instantly react to the temperature of the air flowing over the same. It is the reaction of the thermal bulb through the temperature change of the air flow that is used to start, stop, or modulate the operation of the equipment supplying the conditioned air.

From the above it is seen that the averaging controller also provides an instrument which can act as a low limiting device for preventing air from being delivered into the structure at any temperature lower than a predetermined selected degree which is consistent with comfort.

Other objects and advantages embodied in an instrument comprising the averaging controller of the present invention shall hereinafter be referred to in the following detailed description of a preferred construction thereof having reference to the accompanying drawings forming a part of the specification.

In the drawings:

Fig. 1 is a general diagrammatic layout of a conventional air treating system utilizing the averaging controller as a means for governing the operation of an oil burner adapted for supplying heat to the system;

Fig. 2 is another diagrammatic layout of a conventional heating system illustrating another application of the averaging controller of the present invention;

Fig. 3 is a detailed view of a pneumatic damper control means responsive to the temperature setting of a thermostat remotely located in the particular space or room area being heated;

Figure 6:
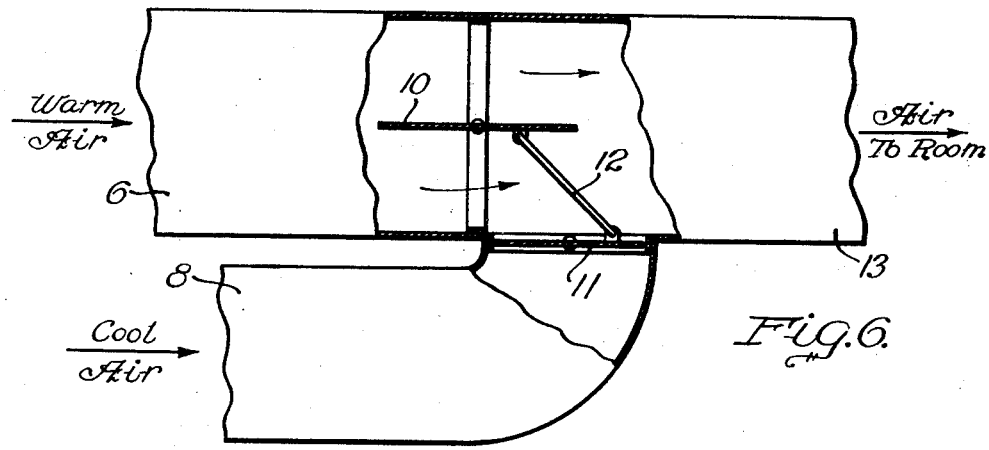
Figure 7:
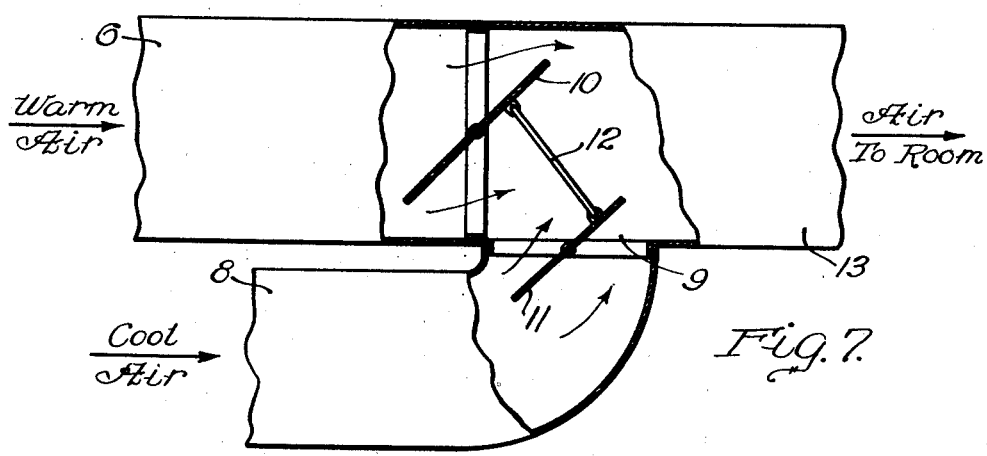
Figure 8:
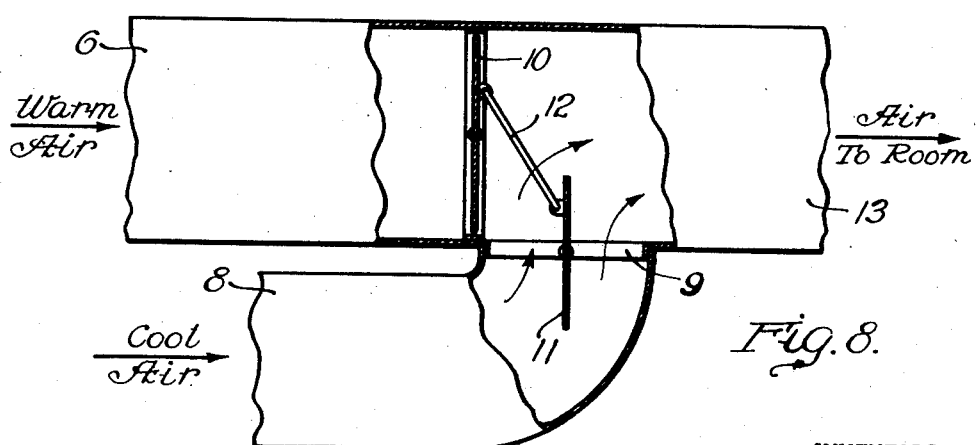

Fig. 4 is a fragmentary diagrammatic perspective view of the damper controlled mixing arrangement and connections between warm air and cool air ducts with the averaging controller installed to operate between the warm air and cool air ducts and responding to the flow of air in the collective areas of each of these ducts immediately prior to individual distribution of treated and mixed air through individual ducts leading to different air spaces or rooms;

Fig. 5 is a transverse cross-sectional view through the averaging controller and adjacent cool air and warm air chambers to better illustrate the details of construction thereof;

Figs. 6, 7, and 8 are side elevational views of the damper sections of the ducts partially broken away and in section to illustrate different positions of the dual duct systems;

Fig. 9 is a diagrammatic view of a modified arrangement of averaging controller in the form of a pneumatic static pressure means applied substantially as shown;

Fig. 10 is another modified design that may be used in the Fig. 9 construction; and Fig. 11 shows a construction having control means that includes mechanism disposed directly in the path of the air flow through a bypass between warm and cool air ducts; which mechanism is responsive to the kinetic energy of such flow and to the direction thereof to control the air conditioning means.

Referring now to Fig. 1, a typical air treating system has been illustrated. This system generally includes a blower 1 receiving cool air through filters 2 from suitable cool air returns, and the blower 1 directs such air into a suitable opening 3 past a humidifying unit 4 into the lower portion of a typical heating unit 5 to be heated as the air passes upwardly through such unit for discharge into a warm air supply duct 6. The heater 5 may be of any typical installation whether coal fired or heated by gas or oil, or by steam pipes, depending entirely upon the most convenient and economical setup for heating a particular structure. In Fig. 1, the heater 5 is heated by means of a conventional oil burner 7 to illustrate such an adaptation.

The cool air discharged from the blower 1 is partially bypassed from a manifold into a cool air duct 8 from which the cool air is eventually discharged at 9 into the warm air duct 6 establishing a mixing zone at such junction. At the point where the ducts 6 and 8 join, a pair of dampers 10 and 11 control the flow of air through each of the ducts 6 and 8 respectively. Such dampers are connected by suitable connecting link means 12 to operate in unison thereby providing a dual mixing control at the junction point of the ducts 6 and 8 for mixing the air in this zone according to the requirements of the room or space to which such treated air is conducted.

Fig. 1 also diagrammatically illustrates the manner in which the angularity of the dual damper arrangement may be regulated. Each of the various discharge ducts 13, 14, 15, etc., leads to a predetermined space or room, and each of these individual ducts receive tempered air from the ducts 6 and 8 as regulated by means of the dampers 10 and 11; such dampers as 10 and 11 being duplicated in each one of the individual room supply ducts. By placing a thermostat such as 16 in the room supplied by a duct, for example, duct 13 in this case, it is possible through electrically operated means 17 to move a link mechanism 18 and 19 for shifting the angular position of the damper 10 and such shifting movement is transmitted to the damper 11 through the connecting link 12.

Thus, each individual space or room can transmit its demands for heating or cooling through the agency of the room thermostat 16 located therein by transmitting such demands to the regulatory mechanism that controls the dampers to provide the proper mixing of warm and cool air to obtain treated air at a definite temperature as determined by such room thermostat.

The use of the averaging controller indicated generally at 20 is diagrammatically illustrated in Fig. 1 in combination with the particular setup above described in connection with the air treating system and provides a master control means for the system. Briefly, the averaging controller 20 is here shown as connected between the ducts 6 and 8 and includes thermal sensitive means connected by means of the conduit 21 or other impulse transmitting means to an adjustable temperature controller 22 to regulate the operation of the latter. Such an adjustable temperature controller 22 may be of any conventional construction capable of transmitting, for example, electrical energy through conduit means 23 to the burner operating power source 24. Therefore, according to the demands of the averaging controller, it is possible through the adjustable temperature controller 22 to cause the burner 7 to operate at specified intervals to maintain the heater 5 at a definite temperature to heat the air coming from the blower 1 and passing into the warm air supply duct 6 to be eventually discharged into any of the plurality of ducts leading from the union point of the warm air duct 6 and the cool air duct 8 as hereinbefore explained.

Fig. 2 illustrates another system wherein the averaging controller is connected for regulating a heater 5a. In this installation a blower 1a discharges air through a filter 2a into a chamber which permits part of the air to pass through the heater 5a into the duct 6a and also allows some of the air to pass into the section 8a of the chamber providing a cool air supply; both of the warm air and cool air supplies being mixed by means of dampers 10a and 11a for passage into a room supply duct 13a. The room thermostat 16a causes an electrical control unit 17a to regulate the angular positions of the dampers 10a and 11a much in the same manner as in the Fig. 1 system. The averaging controller is here connected between the cool and warm air supply sources substantially analogous to the Fig. 1 connection of the averaging controller 20 where the same is connected between the warm air duct 6 and the cool air duct 8.

Referring briefly to Fig. 3, a modified arrangement is here shown for regulating the angularity of the dual dampers for controlling the flow of air from the warm air duct 6 and the cool air duct 8 into the common room duct 13, etc. In Figs. 1, 2, and 4 the installation depicts the use of room thermostats to sensitize electrically operated units 17 which may comprise connected reversing motors shielded in a housing and adapted for actuating the link mechanisms 18 and 19 to regulate the damper angularities. In the Fig. 3 construction the thermostat 25 is a pneumatic type thermostat for transmitting air pressure through a tube 26 forming part of a closed system containing air under pressure (15#/sq. in. for example) and which air expands into the cylinder 27 to actuate a piston 28 against the resilient action of a spring 29 thereby moving a link 30 by means of rod 31 for actuating the arm 32 which shifts the angularity of the two dampers 10 and 11. Thus, the regulation of the damper angularities can be carried out electrically, pneumatically, or similarly to the latter hydraulically if necessary depending upon the character of the installation desired. Such regulating instruments may be applied to any typical system as in Fig. 1 or Fig. 2, or the like.

Referring now more particularly to Figs. 4 and 5, the function and construction of the averaging controller 20 can there be better understood. The averaging controller 20, as seen in Fig. 5 provides means connected directly between the warm air duct 6 and the cool air duct 8. This instrument consititutes a housing 35 attachable to the warm air duct 6 for supporting a warm air manifold or tube 36 having a cool air tube 37 connected therewith and depending therefrom to join as shown with a cool air duct at 38. A selected orifice 39 is disposed in the open end of the tube 36 to throttle down air movements between the warm air chamber 6 and the interior of the tube 36. Likewise, a similar orifice 40 is placed within the open end of the tube 37 adjacent the tube 36 to throttle down air movements between the cool air duct 8 and the interior of the tube 36.

Tube 36 therefore provides a common chamber or manifold between the warm air duct 6 and the cool air duct 8 for the reception of a thermal bulb 41 that is suitably positioned within the tube 36 from a closure member or cover 42. A tube 21 communicating with the thermal bulb 41 connects with the adjustable temperature controller 22 as descried in connection with Fig. 1. This adjustable electrical controller 22 makes or breaks an electrical circuit shown in Fig. 5 operating the oil burner 7 or the like.

As further seen in Fig. 5, tube 36 is provided with a lateral venting tube 45 having an opening 46 communicating with the atmosphere. Such a vent tube 45 is further provided with a damper 47 of any conventional type which may be hand regulated and secured into any predetermined desirable angular position.

The description immediately above explains the mechanical details of the instrument comprising the averaging controller 20 and the installation of such instrument is readily conceived by Figs. 4 and 5 illustrating its use. Keeping in mind the general picture of a system such as typified in Fig. 1, the operation of the system is best understood with reference to Fig. 4 which shows a conventional duct layout of the main controlling elements of the portion of the system illustrated in Fig. 1 that is immediately concerned with the present invention.

Assuming that this oil fired warm air system comprises a typical layout for heating a school, and also further assuming that the cool air chamber or duct 8 air temperature is approximately 60 to 70 degrees F., while the warm air in duct 6 is to be kept at a temperature which will keep the mixing dampers at or near an optimum position substantially as illustrated in Fig. 4, the operation of the air treating system may be better explained.

Now by referring to Figs. 6, 7, and 8 which illustrate different damper settings of any one of the dual damper controls of any one room duct such as 13, the following action will take place. When the plant is started in the morning, the rooms of the school will be below the thermostatic setting, and the mixing dampers for mixing and tempering the air for each particular room duct will be open to the warm air chamber and closed to the cool air chamber in the manner illustrated in Fig. 6. When this condition prevails, the air pressure in the warm air ducts will be lower than the air pressure in the cool air duct since there is relief due to the warm air venting or passing through the plurality of ducts leading to the individual rooms of the school.

As the rooms are gradually heated, each of the room thermostats will gradually move the dampers of the corresponding room heating ducts into some intermediate position substantially as indicated in Fig. 7 which typifies the optimum position at which such dual dampers should be maintained. When the dampers are as shown in Fig. 7, the pressure in the two chambers comprising the warm and cool air ducts will equalize due to the relief of the air volume from both of the ducts into the room ducts. When this condition occurs, the oil burner should be shut off since the continued operation of the burner thereafter would cause the dampers to angle into the position indicated in Fig. 8 which indicates an overheated condition in the structure.

Now taking into consideration the averaging controller 20 located immediately in advance of the junction point of the warm and cool air ducts and also ahead of the damper metering or air mixing point 9, it is now evident that unequal pressures in either of the ducts 6 or 8 will create a pressure differential that will cause air flow in the averaging controller tube 36, the air moving in one direction or the other. Such air flow will be characterized by the cool flow of air from the duct 8 into the duct 6 or if flowing in the opposite direction by a heated air flow from duct 6 to duct 8, and this air flow will be retarded or sensitized by the use of the orifice 39 and the orifice 40 located at opposite ends of the manifold or tube 36.

Tube 36, however, encloses the thermal bulb 41 and by setting the adjustable temperature controller 22 at a temperature just above that maintained in the cool air chamber or duct 8, i. e., 75° F. on the assumption that the maximum cool air temperature will be 70° F. the following will occur. During the period that the heating of the rooms occurs wherein the dampers are moved from the Fig. 6 to the Fig. 7 position, cool air will flow through tube 37 into tube 36 by reason of the lower air pressure in the tube 6. So long as this condition prevails, the thermal bulb 41 is cooled by such cool air flow and the adjustable temperature controller 22 will keep the oil burner in operation supplying heat to the heater 5 for heating the warm air as the latter is supplied to the warm air duct 6. However, when the rooms warm up, effecting the individual thermostats therein, the mixing dampers are caused to assume a modulating position in the range approximately shown in Figs. 4 and 7, and the pressure in the two ducts 6 and 8 will become equalized. This condition will cause a termination of air flow through the averaging controller 20 thereby stopping the air motion around the thermal bulb 41 creating a stabilized heating condition. Upon slight further movement of the dampers from the Fig. 7 position toward the Fig. 8 position, the warm air will flow from the duct 6 around the thermal bulb 41 and this will cause the adjustable temperature controller 22 to operate, being responsive to the thermal bulb 41, shutting off the oil burner at this particular stage. Obviously, a decrease of the temperature in the rooms or in any one of the rooms will immediately vary the position of any dual set of dampers or number of sets of dampers moving the same back toward the Fig. 6 position because of the demand for more warm air, and this results in the cool air again flowing from the cool air duct 8 over the thermal bulb 41 which will through its temperature responsive action again operate the adjustable temperature controller 22 for reestablishing the connection through this controller to the oil burner thereby again starting such burner to supply the necessary amount of heat as required by the demands of the structure of building.

Attention is directed to the fact that the movements of the dual dampers as described from Fig. 7 to Fig. 6 or from Fig. 7 to Fig. 8 are only very slight angular displacements, and the Figs. 6 and 8 positions are not reached except under unusual conditions or for off-normal operation as the case may be.

It is to be understood that under perfect duct design and installation design, that the averaging controller 20 would ordinarily work without any adjustment. However, in actual installations perfect conditions are not obtainable so that it is necessary to provide a means for adjusting the flow between the two chambers or ducts 6 and 8 which will provide a controlling means serving to conform with the characteristics or habits of the individual installation. This adjustment has been accomplished by providing the so called bleeder damper 47 operable in the lateral venting ducts 45 functioning to bleed off enough pressure from one of the chambers or ducts so that a balanced condition will be obtained in the averaging controller for definitely suiting the latter to the individual characteristics of the general installation and of the building being conditioned.

When a new system has been installed and is started for the purpose of determining its adaptation to the conditions of the structure, such system is operated to observe the positions of the mixing dampers. At the time when optimum conditions are obtained throughout the air treated structure, the bleeder damper 47 is manually adjusted and secured to control the operation of the oil burner at this particular point. Once the bleeder damper has been adjusted no further change is required since the conditions of the structure will then be maintained regardless of the outside weather conditions or varying uses inside the structure. Since the operation of the instrument is entirely dependent upon the pressure differentials between the two chambers or ducts 6 and 8, when translated into air flow, a change of the total pressure on the system, such as may happen from dirty air filters, or by a decrease in the speed of the blower, will have no effect on the differential regulation provided by the averaging controller 20 in operating the appliance for treating one or the other of the air flows into the chambers 6 and 8.

It has been found that the averaging controller is extremely sensitive and that a change of .001 inch W. G. static pressure will cause a reversal of air flow around the thermal bulb 41 either acting to stop the oil burner or to set the same in operation. Actual tests have been conducted on a school installation having 23 mixing control dual dampers in order to determine the sensitivity of such an instrument and it was further observed that when one of the dampers was manually moved to either of its extreme positions a change of .01 inch W. G. static pressure was produced.

The operation, however, is such that it is the slight movement of a number of dampers that causes it to function. From this it is apparent that a system controlled by the averaging controller herein disclosed and described produces an extremely economical setup operating at a very high efficiency. In observing the system comprising the school installation, it was determined that all mixing dampers generally dwell in the position indicated in Fig. 7 and that they do not travel to either of the extreme positions indicated in Figs. 6 and 8. With a system of the kind disclosed and controlled by the averaging controller 20 it was found that hunting of the dampers such as occurs with conventional controls was practically eliminated, and the drift of the system was found to be in conformance with the needs of the building.

To summarize the inherent advantages of the averaging controller means of the present invention it may be stated that an instrument utilizing the principles set forth and applied as shown forms a simple arrangement which is efficient in operation. The averaging controller of the preferred construction requires only a manifold, with a bleeder damper and connecting conduits, all used in conjunction with a standard adjustable temperature controller regulated through a thermal bulb, such controller functioning to operate a burner or the like. There are no moving mechanical parts to get out of order and adjustment is very simple. Once adjusted, no further attention is required since the instrument compensates for all changes in weather conditions and also for the demands arising from within the structure. Economical operation results by reason of the fact that the correct amount of output from the heating or cooling unit is constantly kept in step with the internal requirements of the structure that receive the treated air.

The personal comfort in the conditioned areas is definitely maintained since the air introduced into these areas is constant both in volume and in temperature with small deviations of either. This is brought about by using the averaging controller in advance of the duct mixing dampers whereby such mixing dampers are substantially maintained in approximately the same positions at all times during the normal operation of the heating system.

In conclusion it is seen that the averaging controller described responds directly to pressure differentials between the two chambers or ducts connected thereby, and the controller receives its initiative by the flow of air from one to the other of said chambers and that the temperature of the air regulates the operation of an appliance through the introduction of the thermal bulb 41. In order to illustrate one variation in carrying out the principles embodied in a device of the present invention, Fig. 9 has been added to show a pneumatic static pressure unit which also utilizes the pressure differential between two chambers such as ducts 6 and 8. In Fig. 9, two relatively sensitive diaphragms 50 and 51 respond directly to the difference in pressure between the ducts 6 and 8, respectively, and such diaphragms are connected to opposite ends of a long rockable line 52 pivotally supported at 53. A relatively long operating arm 54 may be directly connected at the pivotal point of the line 52, such arm 54 also being provided with an adjustable insulated screw 55 that is adapted to engage and close the contacts 56 to establish current flow to the oil burner or other device. Therefore, by energizing the mechanisms of the temperature controller 22 it is possible to start and stop an oil burner or other air treating appliance in the same manner as was accomplished by the averaging controller illustrated in Fig. 5.

It is obvious that other constructions may be employed for creating a pneumatic static pressure regulator which is directly responsive to the difference in pressure between the warm and cool air ducts as explained. Referring to Fig. 10, a diagrammatic arrangement has been illustrated wherein an arm 54a, similar to the arm 54 in Fig. 9, may be utilized in operating a wiper 57 which initially closes a circuit by engaging the contacts 58 and 59 energizing the appliance operating unit 60, which is a device which modulates the heating or cooling means. In this case a resistance unit 61 has been interposed in the circuit for the purpose of producing a variable current flow to the unit 60 beginning with a reduced current flow and consequently inducing a small capacity output of the unit 60. As the demands of the system increase, the wiper 57 travels over the resistance 61 cutting out additional current resistance and producing a greater current flow thereby increasing the output of unit 60.

Figs. 9 and 10, therefore, illustrate certain variations which may be employed for producing the key regulation for an air conditioning system so arranged and adapted for producing efficient and comfortable air flow to different rooms or spaces and wherein a heating economy results which surpasses the economy of conventional heating or air conditioning systems that are now in use.

Fig. 11 shows a control means for regulating the operation of an air conditioning means to temper the air in ducts 6 or 8, or in both if required. This control means is indicated as 20a and comprises a manifold 65 connecting the ducts, with a sail or disc barrier 66 mounted upright therein upon low friction bearings 67. A stem or arm 68 passes out of the manifold 65 and carries a mercury switch 69 having connections 70 that lead to any air conditioning means that may be similar to that shown in Fig. 1 comprising a heater 5, heated by an oil burner 7. The barrier 66 and mercury switch 69 are balanced and the kinetic energy of the air acting upon the barrier 66 and such air will flow from one duct to the other or vice versa due to pressure differentials created by the air flow control dampers in the ducts will actuate or shut off switch 69.

It is to be understood that other modifications and changes are contemplated in a device of the character described and that other applications of similar or analogous natures are also possible over and above those specifically illustrated in the disclosures. Therefore, the invention is not to be limited to the exact form, arrangement or combination of parts shown nor to the exact constructions described excepting insofar as shall be governed by the scope of the language in the appended claims directed to the invention.

What we claim is:

1. In an air treating system, in combination, warm and cool air ducts terminating in a mixing zone, conduits connected with said zone to conduct the mixed air supply to given spaces, air flow control means in said mixing zone to regulate the air flow from each of said respective ducts, air conditioning means for tempering the air in said ducts, and a master control means connected between said ducts and responsive to pressure differentials established in said ducts by said air flow control means, said master control means having connection with said air conditioning means to control the operation of the latter.

2. In an air treating system, in combination, warm and cool air ducts terminating in a mixing zone, conduits connected with said zone to conduct the mixed air supply to given spaces, air flow control means in said mixing zone to regulate the air flow from each of said respective ducts, thermostatic means disposed in said given spaces and connected to operate said air flow control means, air conditioning means for tempering the air in said ducts, and a master control means connected between said ducts and responsive to pressure differentials established in said ducts by said air flow control means, said master control means having connection with said air conditioning means to control the operation of the latter.

3. In an air treating system, in combination, warm and cool air ducts terminating in a mixing zone, a conduit connected with said zone to conduct the mixed air supply to a given space, air flow control means in said mixing zone to regulate the air flow from each of said respective ducts, an air conditioning means for tempering the air in one of said ducts, an adjustable temperature controller connected to operate said air conditioning means at predetermined temperature settings, and a master control means connected between said ducts and responsive to the pressure differentials created by said air flow control means, and said master control means being connected with said adjustable temperature controller for actuating the latter at said predetermined temperature setting to control the operation of said air conditioning means.

4. In an air treating system, in combination, warm and cool air ducts terminating in a mixing zone, a conduit connected with said zone to conduct the mixed air supply to a given space, air flow control means in said mixing zone to regulate the air flow from each of said respective ducts, an air conditioning means for tempering the air in one of said ducts, an adjustable temperature controller connected to operate said air conditioning means at predetermined temperature settings, and thermal responsive control means disposed in an air flow bypass tube connected between said ducts, said thermal responsive control means reacting to the temperature of the flow of air moving from one of said ducts to the other thereof as determined by the pressure differentials established by said air flow control means, and said thermal responsive control means having connection with said adjustable temperature controller to actuate the latter at a predetermined temperature setting to control the operation of said air conditioning means.

5. In an air treating system, in combination, connected warm and cool air supply ducts, means for regulating the air flow from each duct to supply a given area with air at a predetermined temperature, a unit to temper the air in one of said supply ducts, and control means to regulate the air temperature in said one supply duct comprising a manifold having communication with both ducts, and operable means directly responsive to the direction of flow of air through said manifold from one to the other of said ducts as determined by the pressure differentials established by said duct air flow regulating means, said operable means being connected with said air tempering unit to control the operation of the latter.

6. In an air treating system, in combination, connected warm and cool air supply ducts, means for regulating the air flow from each duct to supply a given area with air at a predetermined temperature, a unit to temper the air in one of said supply ducts, and control means to regulate the air temperature in said one supply duct comprising a manifold having communication with both ducts, and temperature responsive means disposed in said manifold and connected with said air tempering unit to control the operation of the latter.

7. In an air treating system, in combination, connected warm and cool air supply ducts, means for regulating the air flow from each duct to supply a given area with air at a predetermined temperature, a unit to temper the air in one of said supply ducts, and control means to regulate the air temperature in said one supply duct comprising a manifold, tubes connecting said manifold for communication with each duct, and a thermal responsive bulb in said manifold connected with an adjustable temperature controller, and said adjustable temperature controller being connected with said air tempering unit to control the operation of the latter.

8. In an air treating system, in combination, connected warm and cool air supply ducts, means for regulating the air flow from each duct to supply a given area with air at a predetermined temperature, a unit to temper the air in one of said supply ducts, and control means to regulate the air temperature in said one supply duct comprising a manifold, tubes connecting said manifold for communication with each duct, a closure in each of said tubes having equal sized openings therein to restrict air flow from one to the other of said ducts, and a thermal responsive bulb in said manifold disposed between said closures having connection with an adjustable temperature controller, and said latter being connected with the air tempering unit to control the operation of the latter.

9. In an air treating system, in combination, connected warm and cool air supply ducts, mixing damper mechanism for regulating the air flow from each duct to supply a given area with air at a predetermined temperature, a unit to temper the air in one of said supply ducts, and control means to regulate the air temperature in said one supply duct comprising a manifold having communication with both ducts, temperature responsive means disposed in said manifold and connected with said air tempering unit to control the operation of the latter, said temperature responsive means being heated or cooled by the flow of air from one to the other of said ducts as determined by said damper mechanism, and adjustable vent means connected with said manifold to bleed air therefrom to establish a predetermined optimum setting for said mixing damper mechanism for a given operative temperature effective to actuate said temperature responsive means.

10. An averaging controller for a hot air heating system, comprising the combination with a warm air supply chamber, a cool air return chamber, a mixing zone for said chambers, and dampers to control the passage of air from said warm and cool air chambers into said mixing zone, of a control means arranged for communication with each of said chambers and directly responsive to the pressure differential between said chambers, conditioning means to temper the air in one of said chambers, and operable means connecting said control means with said air tempering conditioning means for regulating the output of the latter.

11. The method of controlling the tempering of air for delivery to given spaces to maintain each of said spaces at predetermined temperatures, comprising mixing warm and cool air from ducts in certain ratios for each space, establishing such mixture ratios through thermostatic means in each space, providing means between said air ducts to bypass air from one to the other of the ducts in advance of the mixing point of the warm and cool air while pressure differentials prevail in said ducts, and by controlling the temperature of the air supplied in one of said ducts with thermal responsive means placed in the path of the bypassed air flow from one to the other of said air ducts.

12. The method of controlling the tempering of air for delivery to given spaces to maintain each of said spaces at predetermined temperatures, comprising mixing warm and cool air from ducts in certain ratios for each space, establishing such mixture ratios through thermostatic means in each space, providing a first means responsive to air pressure differentials existing between the warm and cool air ducts in advance of the mixing of said air streams, and further providing a second means to control a source for tempering one of the air streams by connecting the same with said first means to respond directly to the variation in the pressure differentials experienced between the warm and cool air streams.

RALPH A. LINGEN.
LLOYD E. CROSS.

REFERENCES CITED

The following references are of record in the file of this patent:

UNITED STATES PATENTS

| Number | Name | Date |
| --- | --- | --- |
| 2,188,775 | Locke | Jan. 30, 1940 |